United States Patent [19]

Ohtsuka et al.

[11] Patent Number: 4,980,093

[45] Date of Patent: Dec. 25, 1990

[54] METHOD OF TREATING HIGH-LEVEL RADIOACTIVE WASTE LIQUID

[75] Inventors: Katsuyuki Ohtsuka; Isao Kondoh; Takeshi Kawasaki, all of Tokai, Japan

[73] Assignee: Doryokuro Kakunenryo Kaihatsu Jigyodan, Tokyo, Japan

[21] Appl. No.: 362,913

[22] Filed: Jun. 8, 1989

[30] Foreign Application Priority Data

Jun. 17, 1988 [JP] Japan ............................. 63-149654

[51] Int. Cl.5 ............................................ B01D 59/00

[52] U.S. Cl. ....................................... 252/632; 423/2; 423/11

[58] Field of Search ...................... 252/632; 423/2, 11

[56] References Cited

U.S. PATENT DOCUMENTS 3,205,588 9/1965 Oetjen et al. ...................... 252/632

3,281,371 10/1966 Nerge et al. ...................... 252/632

*Primary Examiner*—Edward A. Miller

*Assistant Examiner*—Ngoclan T. Mai

*Attorney, Agent, or Firm*—Armstrong, Nikaido, Marmelstein, Kubovcik & Murray

[57] ABSTRACT

A high-level radioactive waste liquid, produced in a reprocessing plant, is treated by a freeze-drying step. A low-level radioactive waste liquid containing water, nitric acid and nuclides is obtained from the sublimate of the freeze-drying step. Fission products, actinides, corrosion products (iron, chromium, nickel, etc.), sodium nitrate and sodium hydroxide, not sublimated, are separated as a residue. An alkaline solution such as sodium hydroxide solution is added to the residue to dissolve sodium nitrate and sodium hydroxide. The dissolved nitrate and hydroxide are then separated from the residue containing fission products and the corrosion products.

6 Claims, 2 Drawing Sheets

METHOD OF TREATING HIGH-LEVEL RADIOACTIVE WASTE LIQUID

BACKGROUND OF THE INVENTION

The present invention relates to a method of treating a high-level radioactive waste liquid produced in a reprocessing plant. More specifically, the present invention concerns a method of treating a high-level radioactive waste liquid wherein the high-level radioactive waste liquid is largely classified into (1) condensate, (2) bulk wastes mainly containing sodium nitrate, sodium hydroxide, etc., and (3) a residue comprising fission products, actinoids, and corrosion products (iron, chromium, nickel, etc.) occurring in a reprocessing process, including nitrate, oxides, etc., and wherein (1) the condensate and (2) sodium nitrate, sodium hydroxide, etc., are converted into a low-level radioactive waste, and the amount of the residue including fission products, actinoids, and corrosion products is reduced substantially by removing (3) sodium nitrate, sodium hydroxide, etc. In this method, as the residue is stored in the form of nitrate, oxides, and the like, storage is facilitated, and recovery of useful elements in the future is made possible as the residue containing useful elements is separated.

Hitherto, as a method of permanently separating radioactive wastes from an environment without requiring artificial operations, a glassification treatment process is adopted in which waste is provisionally stored as a liquid for a certain period and is then glassified to ensure that the radioactive substances contained in the waste will not move for a long period of time. The radioactive waste liquid produced in a reprocessing plant is mainly constituted by a large amount of sodium nitrate and sodium hydroxide, and disposal of this waste liquid is effected by dissolving the waste together with a large amount of a glass-forming agent, thereby effecting the aforementioned glassification treatment.

However, when glass having good qualities (properties) is formed in this glassification treatment, the amount of sodium that can be contained in the glass is limited. Consequently, there is a drawback in that it is difficult to convert a large amount of high-level waste liquid into a small amount of a glassified body, with the result that the amount of glassified body produced becomes disadvantageously large.

In addition, since the high-level radioactive liquid is heated and dissolved at a high temperature, there is the problem of the component materials of equipment from becoming corroded. Hence, when a need arises in the future to recover useful elements, the separation and recovery of useful elements are estimated to be difficult.

SUMMARY OF THE INVENTION

Accordingly, an object of the present invention is to provide a method of treating a high-level radioactive waste liquid which is ① capable of safely separating from a high-level radioactive waste liquid a condensate, a nitric acid solution, and bulk wastes mainly containing sodium nitrate, sodium hydroxide, etc., and of separating most of fission products, actinoids, and corrosion products occurring during a reprocessing process such as iron, chromium, nickel, etc., as a residue containing nitrate, oxides, etc. in a stable form, which ② facilitates recovery of useful elements contained in the residue, which is ③ capable of substantially reducing the volume of a glassified body as compared with a conventional case where the high-level radioactive waste liquid is glassified as it is, and which is ④ capable of enhancing safety without causing corrosion of the materials of equipment, an explosion, a fire, or the like.

To this end, according to the present invention, there is provided a method of treating a high-level radioactive waste liquid, comprising the steps of: freezing and sublimating a high-level radioactive waste liquid produced at a reprocessing plant so as to separate the high-level radioactive waste liquid into evaporation substances that are sublimated and the residue that is not sublimated; condensing the sublimated evaporation substances; and adding a solution to the residue that is not sublimated and separating the mixture into a solid and a liquid, the solid being the residue that is not dissolved in the solution, and the liquid being a solution in which the other components are dissolved.

More specifically, in the condensing step, a low-level radioactive waste liquid mainly containing water, nitric acid, and nuclides that are sublimated is extracted as the condensate. The residue that is not sublimated mainly comprises sodium nitrate and sodium hydroxide, fission products, and corrosion products occurring in a reprocessing process. In the solid/liquid separating step, a sodium hydroxide solution or the like (alkaline solution) is added to the residue that is not sublimated to dissolve sodium nitrate, sodium hydroxide, and the like, and the mixture is separated into a solution and the residue that is not dissolved in the solution, including fission products and corrosion products and the like occurring in a reprocessing process. The residue that is not dissolved is stored in the form of nitrate, hydroxides, a roasted body, or the like. The solution separated in the solid/liquid separating step is treated in a low-level radioactive waste liquid treating system.

DETAILED DESCRIPTION OF THE PREFERRED EMBODIMENTS

Referring now to the accompanying drawings, a description will be given of the preferred embodiments of the present invention.

Figure 1:
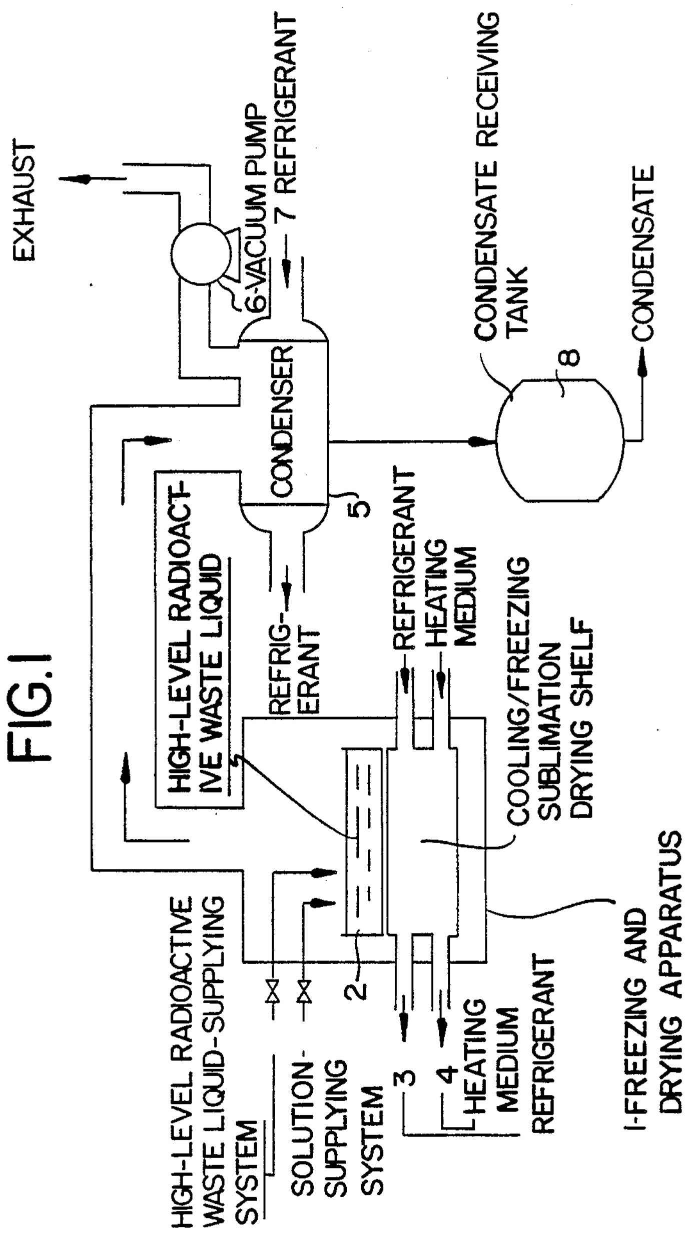
FIG. 1 is a schematic diagram of the overall configuration of a method of treating a high-level radioactive waste liquid in accordance with the present invention.

FIG. 1 is a schematic diagram of the overall configuration of a method of treating a high-level radioactive waste liquid in accordance with the present invention. In the drawings, reference numeral 1 denotes a freezing and drying apparatus; 2, a high-level radioactive waste liquid; 3, a refrigerant; 4, a heating fluid (medium); 5, a condenser; 6, a vacuum pump; 7, a refrigerant; and 8, a condensate-receiving tank.

In the drawing, the high-level radioactive waste liquid 2 is adapted to be supplied from a high-level radioactive waste liquid-supplying system and a solution-supplying system to the freezing and drying apparatus 1. The refrigerant 3 and the heating medium 4 are supplied to the freezing and drying apparatus 1 and are discharged therefrom so as to cool and freeze, sublimate and dry the high-level radioactive waste liquid 2. The substance sublimated in the freezing and drying apparatus is supplied to the condenser 5. The refrigerant 7 is supplied to the the condenser 5 and is discharged therefrom, and is exhausted by the vacuum pump 6. The condensate is stored in the condensate-receiving tank 8, and is removed therefrom.

Figure 2:
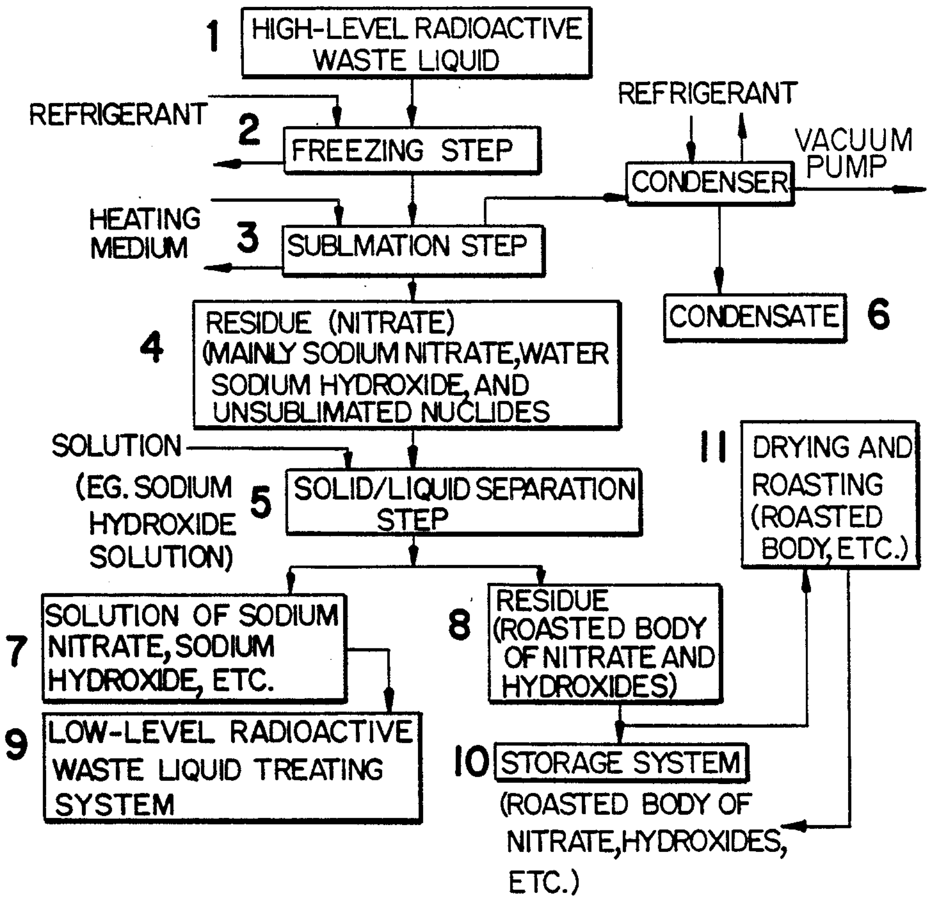
FIG. 2 is a diagram illustrating process flow thereof.

Referring now to FIG. 2, a description will be given of the process flow of the high-level radioactive waste liquid.

The high-level radioactive waste liquid ① containing sodium nitrate, sodium hydroxide, fission products, actinoids, corrosion products (iron, chromium, nickel, etc.), during a reprocessing process and the like is cooled a freezing process ② . The frozen high-level radioactive waste liquid (frozen material) is subjected to heating and pressure reduction and is placed in a vacuum in a sublimation process ③ . Hence, nitric acid, water, nuclides, etc., are sublimated from the frozen material, and the sublimated nitric acid, water, nuclides, etc., are condensed into condensate ⑥ in the condenser. In the main, sodium nitrate and sodium hydroxide, as well as fission products, actinoids, and corrosion products (iron, chromium, nickel, etc.) occurring in the reprocessing process and all of which do not evaporate, remain as the residue ④ of nitrate. If, for instance, a sodium hydroxide solution is added to this residue so as to dissolve sodium nitrate and sodium hydroxide, most of the fission products, actinoids, and the corrosion products occurring during the reprocessing process are not dissolved and remain as the residue. Next, in a solid/liquid separation process ⑤ , the waste liquid is separated into a solution ⑦ containing sodium nitrate, sodium hydroxide and the like and into the residue ⑧ consisting of the fission products, actinoids, and the corrosion products in the reprocessing process.

The solution ⑦ containing sodium nitrate, sodium hydroxide and the is sent to a low-level radioactive waste liquid processing system ⑨ and is either refined and reused or used as raw material for low-level radioactive waste solids. The residue ⑧ is dried and roasted in a process ⑪ , for instance, so as to be provided with the form and volume of nitrate, dried and roasted products, or the like for facilitating storage. In addition, since its form is suited for separating and recovering useful elements contained through cupellation or the like in the future, it is sent to a storage system ⑩ .

As described above, in accordance with the present invention, the high-level radioactive waste liquid can be separated into (a) condensate (nitric acid solution), (b) bulk wastes mainly containing sodium nitrate, sodium hydroxide, etc., and (c) residue (nitrate) mainly containing fission products, actinoids, and corrosion products (iron, chromium, nickel, etc.) in the reprocessing process. As a result, (1) since the high-level radioactive waste liquid is separated by the freeze-vacuum-drying process, (2) the problem of corrosion due to high temperature is overcome, (3) and the condensate (nitric acid solution) and bulk wastes mainly containing sodium nitrate and sodium hydroxide can be converted into low-level radioactive waste. In addition, (4) if the residue containing fission products, actinoids, and corrosion products (iron, chromium, nickel, etc.) that have stable configurations as nitrate and roasted product is stored in the form of residue, it is advantageous at the time when useful elements (rhodium, palladium, etc.) contained in the residue (nitrate or roasted material) are recovered in the future. Furthermore, (5) when a glassified body is made, since the amount of sodium is small, a high-quality glassified body can be formed, so that the amount of a glassified body produced can be reduced substantially. Moreover, fractionated substances can be used as raw material for artificial minerals (e.g., titanium, zirconium, calcium, barium, aluminum).

What is claimed is:

1. A method for treating a high-level radioactive waste liquid, comprising the steps of:

(a) freezing and sublimating a high-level radioactive waste liquid produced at a reprocessing plant to separate said high-level radioactive waste liquid into a sublimate and a residue that is not sublimated;

(b) condensing the sublimate;

(c) adding an alkaline solution to the residue that is not sublimated to obtain a mixture (d) separating the mixture obtained in step (c) into a solid component and a liquid component, said solid component being the residue that is not dissolved in said mixture of step (c), and said liquid component being a solution in which remaining components are dissolved.

2. A method of treating a high-level radioactive waste liquid according to claim 1, wherein in said condensing step the sublimate comprises a low-level radioactive waste liquid containing water, nitric acid, and nuclides.

3. A method of treating a high-level radioactive waste liquid according to claim 1, wherein said residue that is not sublimated comprises sodium nitrate and sodium hydroxide, fission products, and corrosion products occurring in a reprocessing process.

4. A method of treating a high-level radioactive waste liquid according to claim 1, wherein, in step (c), said alkaline solution is a sodium hydroxide solution.

5. A method of treating a high-level radioactive waste liquid according to claim 1, wherein said residue that is not dissolved is stored in the form of nitrate, hydroxides, or a roasted body.

6. A method of treating a high-level radioactive waste liquid according to claim 1, wherein the solution separated in said solid/liquid separating step is treated in a low-level radioactive waste liquid treating system.

* * * * *